(12) United States Patent
Fan et al.

(10) Patent No.: US 11,646,651 B2
(45) Date of Patent: May 9, 2023

(54) RAMP GENERATOR FOR A CONSTANT ON-TIME DC-DC CONVERTER

(71) Applicants: Jiwei Fan, Cary, NC (US); Yingqian Ma, Guangdong (CN); Jingyuan Chen, Guangdong (CN); Hal Chen, Short Hill, NJ (US); Jialun Du, Dublin, OH (US)

(72) Inventors: Jiwei Fan, Cary, NC (US); Yingqian Ma, Guangdong (CN); Jingyuan Chen, Guangdong (CN); Hal Chen, Short Hill, NJ (US); Jialun Du, Dublin, OH (US)

(73) Assignee: Reed Semiconductor Corp., Warwick, RI (US)

( * ) Notice: Subject to any disclaimer, the term of this patent is extended or adjusted under 35 U.S.C. 154(b) by 132 days.

(21) Appl. No.: 17/305,541

(22) Filed: Jul. 9, 2021

(65) Prior Publication Data
US 2023/0012123 A1 Jan. 12, 2023

(51) Int. Cl.
 *H02M 1/14* (2006.01)
 *H02M 3/158* (2006.01)
 *H02M 1/08* (2006.01)
 H02M 1/44 (2007.01)
 H02M 1/15 (2006.01)

(52) U.S. Cl.
 CPC ............ *H02M 1/143* (2013.01); *H02M 1/08* (2013.01); *H02M 3/158* (2013.01); *H02M 1/14* (2013.01); H02M 1/15 (2013.01); H02M 1/44 (2013.01)

(58) Field of Classification Search
 None
 See application file for complete search history.

(56) References Cited

U.S. PATENT DOCUMENTS

| 5,317,199 A | * | 5/1994 | Jordan | H03K 4/50 327/134 |
| 8,080,987 B1 | * | 12/2011 | Qiu | H02M 3/156 323/284 |
| 9,124,177 B2 | * | 9/2015 | Zhu | H02M 3/1588 |
| 2018/0131888 A1 | * | 5/2018 | Lee | H03K 4/26 |
| 2020/0321946 A1 | * | 10/2020 | Colles | H03K 3/023 |

* cited by examiner

*Primary Examiner* — Matthew V Nguyen
(74) *Attorney, Agent, or Firm* — Dunlap Bennett & Ludwig, PLLC

(57) ABSTRACT

A ramp generator for a constant on-time DC-DC converter, wherein the ramp generator is configured to reduce DC offset and smooth transitions between conduction modes. The ramp voltage generator includes a common voltage generator suitable for generating a common voltage; a first ramp voltage generation block suitable for generating a first ramp voltage responsive to a first switching signal and a control signal, wherein the first switching signal resets one or more valley points of the first ramp voltage to one or more valley points of the common voltage; and a second ramp voltage generation block suitable for generating a second ramp voltage responsive to a second switching signal, the first ramp voltage, and the control signal.

7 Claims, 2 Drawing Sheets

Timing Signals: PWM, Vrst, ZX

Ramp Signals at CCM

Ramp Signals at DCM

RAMP GENERATOR FOR A CONSTANT ON-TIME DC-DC CONVERTER

BACKGROUND OF THE INVENTION

The present invention relates to switching power supplies and, more particularly, a ramp generator for a constant on-time DC-DC converter, wherein the ramp generator is configured to reduce DC offset and smooth transitions between conduction modes.

DC-DC converters play a vital role in efficient power management in various portable devices. However, DC-DC converters are made of non-ideal components and/or arrangements that suffer from parasitic losses and inefficiencies. Accordingly, DC-DC converter components must be carefully specified and physically arranged to achieve stable operation and to keep switching noise (EMI/RFI) at acceptable levels.

One type of DC-DC converter uses ramp-based constant on-time control schemes to control output. In these DC-DC converters there are two operation modes, continuous-conduction mode (CCM) and discontinuous-conduction mode (DCM). Such constant on-time DC-DC converters have a system offset on the feedback voltage. The offset is equal to the half of the amplitude of the ramp voltage.

For the ramp-based constant on time control schemes, the next on pulse is issued when the feedback voltage (VFB) +the added ramp voltage (VRP-VRN) is equal to the reference voltage (VREF). And at that point, VRP-VRN=0.5*RampAmplitude, wherein the VFB-VREF =VRP-VRN =0.5*RampAmplitude. This is the system offset which normal DC-DC converters based on constant on time control designs will have.

At the boundary of DCM and CCM, however, the ramp shape is different from the inductor current shape. Specifically, the ramp will have lower ramp up slew rate and higher ramp down slew rate compared to the inductor current. This slew rate difference can make the next on pulse happen earlier than needed and/or may cause multiple pulses in DCM and chattering at the boundary of DCM and CCM operation.

The system offset normally is in the range of 10-20mV, which may cause a 20-100mV voltage offset on the output voltage. For low-cost systems, this offset can be tolerated. For power systems with higher output accuracy requirements, an integrator is added to correct this error. This integrator and the clamp circuit paired with it make the whole converter more complicated and may hurt the converter's transient response.

Current methods to generate the ramp voltage produce ramp voltage waveforms with a different shape or waveform than the inductor current shape. This difference will cause chattering at the DCM/CCM boundary. If a converter ignores the DC offset generated by the Ramp, the converter can only be used on the low-end market. For high-end customers, adding an integrator can compensate the system error but a clamp circuit must be added to the output of the integrator to avoid the output saturation of the integrator during DCM mode. Integrator's response time and clamp voltage level will affect the load transient response of the DC-DC converter.

The multiple pulses in DCM and chattering between DCM and CCM mode can happen at certain power conditions for a converter with constant on time controls. When it happens, the multiple pulses can pump more energy than necessary to the output and make the output ripple much bigger. The chattering between DCM and CCM will also cause bigger VOUT ripple. For the multiple pulses and chattering between DCM and CCM mode, some converters just ignore it and must accept the higher ripple on the output voltage when the converter is working at the boundary of the DCM and CCM mode.

As can be seen, there is a need for a ramp generator for a constant on-time DC-DC converter, wherein the ramp generator is configured to reduce DC offset and smooth transitions between conduction modes. The DC-DC converter embodied in the present invention only issues single pulses in DCM mode, eliminating chattering between DCM and CCM mode, resulting in a smoother output voltage.

For the offset problem, the present inventions softly resets the valley point of the positive ramp voltage and the negative ramp voltage to the same common voltage at the rising edge of the PWM signal.

Specifically, during DCM, the present invention is configured to softly park the positive ramp voltage and negative ramp voltage to a lower voltage than the common voltage. This lower voltage is below the common voltage minus half of the ramp voltage. By softly resetting the valley point of VRP and VRN to the same common voltage, the VRP-VRN=0 at the on-time trigger time. Therefore, the VFB-VREF =VRP-VRN =0, and thereby the system offset is gone.

Furthermore, by softly parking the VRP and VRN to a voltage lower than the normal common voltage in DCM mode, the ramp up slew rate is higher than the inductor current slew rate. And the ramp down slew rate is lower than the inductor current slew rate, and as a result it is harder than necessary to trigger the next on pulse. So, the multiple pulses in DCM are gone.

Additionally, the present invention also creates a system hysteresis at the DCM/CCM boundary through the voltage difference between the parking voltage and the normal common voltage. This hysteresis helps to make the CCM/DCM boundary smooth without chattering.

SUMMARY OF THE INVENTION

In one aspect of the present invention, a ramp voltage generator includes the following: a common voltage generator suitable for generating a common voltage; a first ramp voltage generation block suitable for generating a first ramp voltage responsive to a first switching signal and a control signal, wherein the first switching signal resets one or more valley points of the first ramp voltage to one or more valley points of the common voltage; and a second ramp voltage generation block suitable for generating a second ramp voltage responsive to a second switching signal, the first ramp voltage, and the control signal.

In another aspect of the present invention, the above-mentioned ramp voltage generator is adapted in such a way that the second switching signal resets the one or more valley points of the first ramp voltage to one or more valley points of the common voltage; a pulse generator for generating the control signal; a pulse width modulation circuit for generating a modulation signal having a rising edge triggering the control signal, wherein the first ramp voltage generation block is configured, in a discontinuous-conduction mode, to softly park the first ramp voltage to a lower voltage than the common voltage, wherein the first ramp voltage generation block is configured, in the discontinuous-conduction mode, to softly park the second ramp voltage to a lower voltage than the common voltage, wherein the pulse width modulation circuit generates one a single pulse in the discontinuous-conduction mode.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a ramp generator for a constant on-time DC-DC converter, wherein the ramp generator is configured to reduce DC offset and smooth transitions between conduction modes. The ramp voltage generator includes a common voltage generator suitable for generating a common voltage; a first ramp voltage generation block suitable for generating a first ramp voltage responsive to a first switching signal and a control signal, wherein the first switching signal resets one or more valley points of the first ramp voltage to one or more valley points of the common voltage; and a second ramp voltage generation block suitable for generating a second ramp voltage responsive to a second switching signal, the first ramp voltage, and the control signal.

Figure 1:
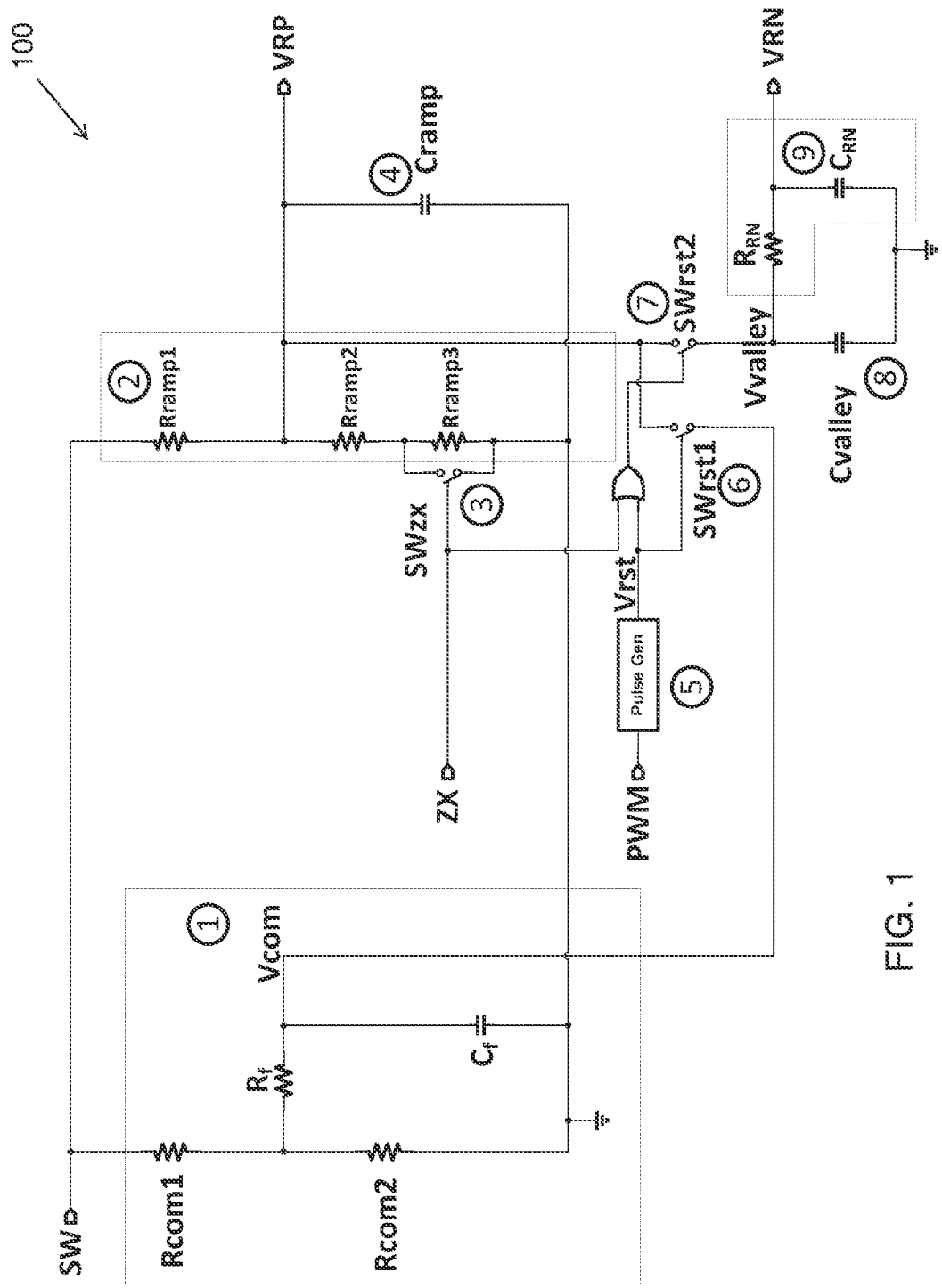
FIG. 1 is a schematic view of an exemplary embodiment of a control circuitry for the ramp generator of the present invention.
Figure 2A:
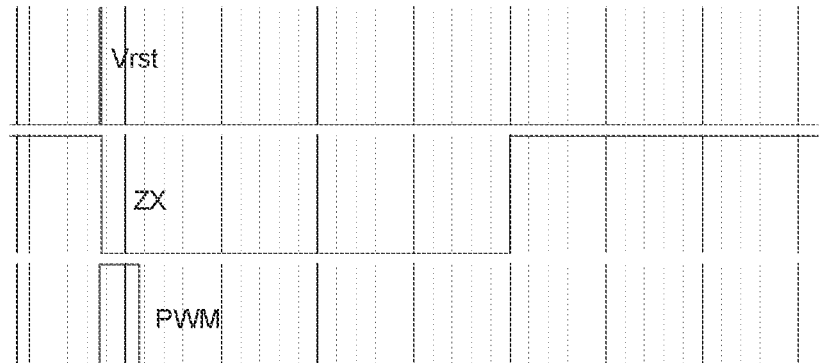
FIG. 2A illustrates example waveforms of timing signals that may be obtained with the exemplary disclosed system of the present invention.
Figure 2B:
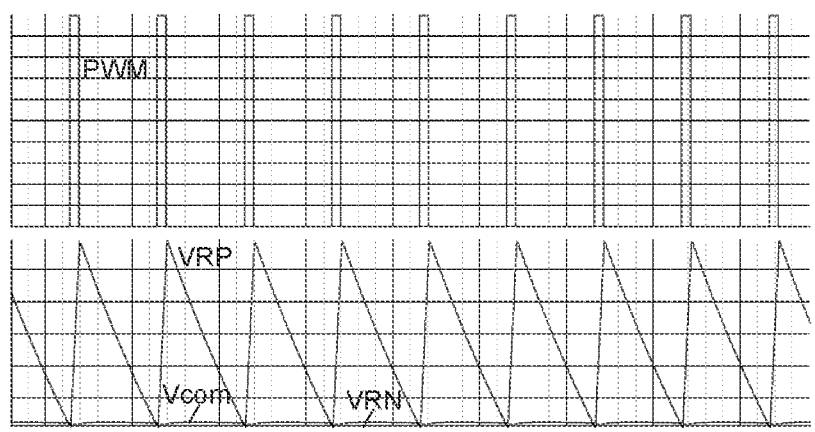
FIG. 2B illustrates example waveforms of Ramp signals at CCM that may be obtained with the exemplary disclosed system of the present invention.
Figure 2C:
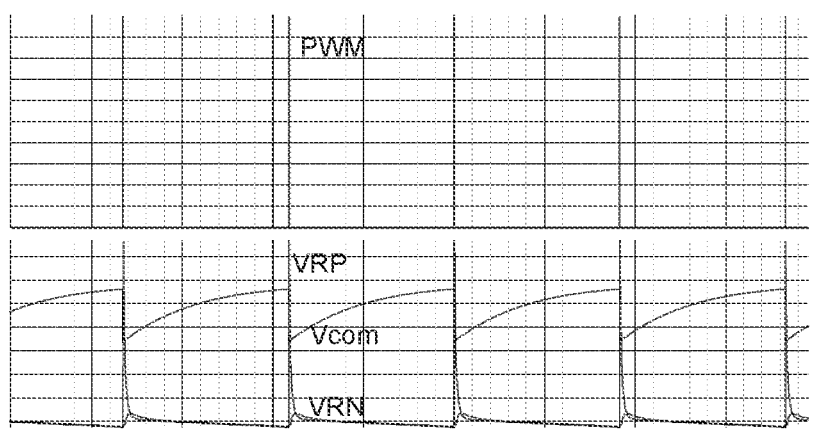
FIG. 2C illustrates example waveforms of Ramp signals at DCM that may be obtained with the exemplary disclosed system of the present invention.

Referring now to FIG. 1, the present invention may include a control circuit 100 for the ramp generator embodied in the present invention, wherein the control circuit 100 has the following components: a common voltage generator having the resistor divider, Rcom1 and Rcom2, and the low pass filter, Rf and Cf; ramp resistors 2 for the positive ramp, VRP; a switch, SWzx 3, which is closed when the inductor current reaches zero; capacitor, Cramp 4, which is connected to ramp resistors 2 to generate the VRP; a pulse generator 5 for generating a narrow pulse (<10nS) at the rising edge of a PWM signal; a first switch, SWrst1 6, adapted to reset the valley point of VRP to the Vcom softly; a second switch, SWrst2 7, resets a valley voltage (Vvalley) to the valley point of VRP; a capacitor, Cvalley 8, adapted to hold the Vvalley of VRP; and a low pass filter 9, RRN and CRN, which generates the VRN from Vvalley. The related waveforms are shown in FIGS. 2A-2C. The timing signals are shown in FIG. 2A.

The SW node voltage is divided down by Rcom1 and Rcom2. The low pass filter Rf+Cf generates the Vcom by averaging the divided down SW node voltage. Resistors, Rramp1, Rramp2 and Rramp3 divided down the SW node voltage and generate a triangle waveform on Cramp 4. By design, Rcom1/Rcom2 =Rramp1/(Rramp2+Rramp3).

When the part works in the CCM mode, the SWrst1 and SWrst2 will be closed for a short time at the rising edge of PWM. As shown in FIG. 2B, with this reset action, the valley points and VRP is equals to the VRN and Vcom. This eliminates the system offset with previous constant on-time DC-DC converters.

In DCM operation mode, when the inductor current reaches zero and is waiting for next PWM pulse, the signal ZX is high. The Rramp3 may be shorted by SWzx 3 and bring down the voltage of VRP from Vsw*(Rramp2+Rramp3)/(Rramp1+Rramp2+Rramp3) to Vsw*(Rramp2)/(Rramp1+Rramp2).

At the same time, SWrst2 7 may be closed to bring down the VRN to the same voltage level. When the next PWM signal comes and SW node voltage is high, the Cramp 4 voltage starts from a lower voltage than the Vcom. The rising slew rate of VRP will be higher than normal, and the falling slew rate is lower, and so the multiple pulses in DCM issue are avoided. The VRP voltage difference between CCM and DCM mode also creates a hysteresis and keeps the mode transition smooth, the waveforms in DCM are shown in FIG. 2C.

The control circuit 100 may be an integrated silicon chip or build it on PCB using discrete components. Some options can be added to Cramp 4 to change the Cramp 4 according to different frequency setting in such a way that the ramp amplitude can be similar for different frequency settings.

To use the present invention, a user need replaces the old ramp generator with this new ramp generator in the dc-dc converter.

It should be understood, of course, that the foregoing relates to exemplary embodiments of the invention and that modifications may be made without departing from the spirit and scope of the invention as set forth in the following claims.

What is claimed is:

1. A ramp voltage generator comprising:
   a common voltage generator suitable for generating a common voltage;
   a first ramp voltage generation block suitable for generating a first ramp voltage responsive to a first switching signal and a control signal, wherein the first switching signal resets one or more valley points of the first ramp voltage to one or more valley points of the common voltage; and
   a second ramp voltage generation block suitable for generating a second ramp voltage responsive to a second switching signal, the first ramp voltage, and the control signal.

2. The ramp voltage generator of claim 1, wherein the second switching signal resets the one or more valley points of the first ramp voltage to one or more valley points of the common voltage.

3. The ramp voltage generator of claim 2, further comprising a pulse generator for generating the control signal.

4. The ramp voltage generator of claim 3, further comprising a pulse width modulation circuit for generating a modulation signal having a rising edge triggering the control signal.

5. The ramp voltage generator of claim 4, wherein the first ramp voltage generation block is configured, in a discontinuous-conduction mode, to softly park the first ramp voltage to a lower voltage than the common voltage.

6. The ramp voltage generator of claim 5, wherein the first ramp voltage generation block is configured, in the discontinuous-conduction mode, to softly park the second ramp voltage to a lower voltage than the common voltage.

7. The ramp voltage generator of claim 6, wherein the pulse width modulation circuit generates one a single pulse in the discontinuous-conduction mode.

* * * * *